(12) United States Patent
Amsellem et al.

(10) Patent No.: US 10,155,327 B2
(45) Date of Patent: Dec. 18, 2018

(54) FASTENING DEVICE FOR COMPACTED PLASTIC BOTTLES INTENDED FOR RECYCLING

(71) Applicants: Maurice Moshe Amsellem, Tel Aviv (IL); Yaakov Amsalem, Tel Aviv (IL)

(72) Inventors: Maurice Moshe Amsellem, Tel Aviv (IL); Yaakov Amsalem, Tel Aviv (IL)

( * ) Notice: Subject to any disclaimer, the term of this patent is extended or adjusted under 35 U.S.C. 154(b) by 0 days.

(21) Appl. No.: 15/555,519

(22) PCT Filed: Apr. 27, 2017

(86) PCT No.: PCT/IB2017/052437
§ 371 (c)(1),
(2) Date: Sep. 4, 2017

(87) PCT Pub. No.: WO2018/015820
PCT Pub. Date: Jan. 25, 2018

(65) Prior Publication Data
US 2018/0281234 A1    Oct. 4, 2018

(30) Foreign Application Priority Data
Jul. 17, 2016  (IL) .......................................... 246809

(51) Int. Cl.
*B29B 17/00*   (2006.01)
*B65D 1/02*   (2006.01)

(52) U.S. Cl.
CPC ........ *B29B 17/0052* (2013.01); *B65D 1/0292* (2013.01); *B29B 2017/0078* (2013.01)

(58) Field of Classification Search
CPC .............. B29B 17/0052; B65D 1/0292; B65D 1/0223; A45F 5/00; A45F 3/20; A45F 3/16
(Continued)

(56) References Cited

U.S. PATENT DOCUMENTS 4,157,103 A * 6/1979 La Fleur ............... B65D 1/0292
                                                 141/338
4,627,546 A   12/1986 Carranza
(Continued)

FOREIGN PATENT DOCUMENTS

CN         103482157        1/2014
EP         0472504          2/1992
(Continued)

OTHER PUBLICATIONS

International Search Report and the Written Opinion dated Aug. 2, 2017 From the International Searching Authority Re. Application No. PCT/2017/052437. (12 Pages).
(Continued)

*Primary Examiner* — Robert J Hicks (57) ABSTRACT

A fastening belt for a recyclable, plastic, beverage bottle including: a length of flexible material affixed around a circumference of the bottle and positioned on a lower part of a body of the bottle; in a first partially compacted the material is disposed in a crease of a fold between the first and the second segments of the bottle; and in a second, compacted state, the material is configured to be passed over the neck of the bottle, thereby securing the first and second segments of the bottle in the compacted state folded over the third segment.

49 Claims, 6 Drawing Sheets

(58) Field of Classification Search
USPC ........ 215/395, 900; 220/666, 756, 754, 752; 24/68 C, 484, 483; 29/525.01, 428; 224/148.1, 148.4–148.7
See application file for complete search history.

(56) References Cited

U.S. PATENT DOCUMENTS

| | | | |
|---|---|---|---|
| 5,174,458 A | 12/1992 | Segati | |
| 5,310,068 A * | 5/1994 | Saghri | B65D 1/0292 215/12.1 |
| 5,562,221 A | 10/1996 | Beniacar | |
| 5,573,129 A * | 11/1996 | Nagata | B65D 1/0292 215/382 |
| 5,758,789 A * | 6/1998 | Shin | B65D 1/0292 215/382 |
| 5,988,464 A * | 11/1999 | Butler | A45F 3/16 224/148.4 |
| 6,279,794 B1 * | 8/2001 | Miyazaki | A45F 3/16 224/148.4 |
| 6,431,406 B1 * | 8/2002 | Pruett | B65D 1/0292 215/900 |
| 7,290,486 B2 * | 11/2007 | Lafond | B30B 9/321 100/214 |
| 7,357,267 B1 * | 4/2008 | Shimada | B65D 1/0292 215/381 |
| 8,985,409 B2 * | 3/2015 | Willows | A45F 5/00 224/148.1 |
| 2005/0139573 A1 * | 6/2005 | Higuchi | B29C 43/021 215/382 |
| 2006/0081555 A1 * | 4/2006 | Mori | B65D 1/0292 215/381 |
| 2008/0087676 A1 * | 4/2008 | Kasboske | B65D 21/086 220/666 |
| 2013/0256310 A1 | 10/2013 | Hojo | |

FOREIGN PATENT DOCUMENTS

| | | | |
|---|---|---|---|
| EP | 0599421 | 6/1994 | |
| EP | 0599421 A1 | 6/1994 | |
| EP | 0719710 A1 | 12/1996 | |
| EP | 0748741 | 12/1996 | |
| EP | 0748741 A1 | 12/1996 | |
| ES | 2136503 | 11/1999 | |
| ES | 1125355 Y | 12/2014 | |
| JP | 3665917 B2 * | 6/2005 | ........... B65D 1/0292 |
| WO | 2016034750 A1 | 3/2016 | |
| WO | WO 2018/015819 | 1/2018 | |

OTHER PUBLICATIONS

International Search Report and the Written Opinion dated Jul. 17, 2017 From the International Searching Authority Re. Application No. PCT/IB2017/052436. (14 Pages).
International Preliminary Report on Patentability dated Jul. 17, 2018 From the International Preliminary Examining Authority Re. Application No. PCT/IB2017/052436. (15 Pages).

* cited by examiner

FASTENING DEVICE FOR COMPACTED PLASTIC BOTTLES INTENDED FOR RECYCLING

FIELD OF THE INVENTION

The present invention relates to a recycling accessory and, more particularly, to an accessory that is added to a single-use beverage bottle to aid in compacting the volume of the empty bottles intended for recycling.

BACKGROUND OF THE INVENTION

The production of plastic bottles is continuously expanding and is replacing other materials. Recycling remains insufficient. 90 billion plastic water bottles are consumed annually worldwide, not including soda and other beverages bottled in disposable plastic bottles.

Only about 14% of plastic bottles are recycled. Approximately 86% of all single-use plastic bottles end up in household garbage and outdoor waste.

SUMMARY OF THE INVENTION

According to the present invention there is provided a fastening belt for a bottle, the bottle being a recyclable, plastic, beverage bottle, the fastening belt including: a length of flexible material affixed around a circumference of the bottle and positioned on a lower part of a body of the bottle;

a first portion of the length of flexible material configured, in a first partially compacted state, to be positioned between a first segment of the bottle disposed below the length of flexible material and a second segment of the bottle disposed above the length of flexible material, wherein in the first partially compacted state the first segment is folded over the second segment and the length of flexible material is disposed in a crease of a fold between the first and the second segments of the bottle, trapping the first portion; and a second portion of the length of flexible material configured, in a second, compacted state, to be positioned proximal a neck of the bottle, wherein in the second, compacted state, the first and second segments are folded over a third segment of the bottle, and, in a third, secured state, the second portion is configured to be passed over the neck of the bottle, thereby securing the first and second segments of the bottle in the compacted state folded over the third segment.

According to additional features the fastening belt is affixed around the bottle in a manufacturing plant or a packaging plant.

According to another embodiment there is provided a fastening belt for a bottle, the bottle being a recyclable, plastic, beverage bottle, the fastening belt including: a length of flexible material affixed around a circumference of the bottle and positioned on a lower part of a body of the bottle.

According to still further features the length of flexible material is positioned on a lower third of the body near a base of the bottle.

According to still further features the length of flexible material is position immediately above the base of the bottle.

According to still further features the length of flexible material is made of a non-elastic, plastic material.

According to still further features the length of flexible material is made of an elastic material.

According to still further features the fastening belt has a resting state and a holding, in the resting state, the fastening belt has a diameter approximately equal to the circumference of the bottle, and in the holding state, the diameter increases between about 10% and 50%.

According to still further features the length of flexible material has a width between about 2 and 6 mm.

According to still further features the fastening belt includes embossed or engraved informational material.

According to another embodiment there is provided a method of securing a compacted mass of a bottle to a neck of the bottle, including: (a) providing a fastening belt affixed around a circumference of the bottle; (b) compacting a base and a body of the bottle, to provide a compacted mass; and (c) securing an exposed section of the fastening belt around the neck of the bottle, so as to hold the compacted mass to the neck of the bottle.

According to still further features the body is flattened and the base is folded over the flattened body, to provide the compacted mass.

According to still further features about half of the fastening belt is positioned in a first fold between the base and the body of the bottle.

According to still further features the exposed section of the fastening belt is proximal to the neck of the bottle after the base has been folded over the flattened body at least twice.

According to still further features the exposed section of the fastening belt is lifted over a finish section of the bottle in order to secure the compacted mass to the neck of the bottle.

According to another embodiment there is provided a method of securing a compacted mass of a bottle to a neck of the bottle, including:

(a) providing a fastening belt affixed around a circumference of the bottle;

(b) folding a first segment of the bottle over a second segment of the bottle, the first segment proximal a base of the bottle and disposed below the fastening belt and the second segment disposed above the fastening belt, such that a portion of the fastening belt is trapped between the first segment and the second segment;

(c) folding the first and second segments over a third segment of the bottle, the third segment proximal the neck of the bottle, such that a second portion of the fastening belt is disposed proximal the neck of the bottle; and (d) securing the second portion of the fastening belt over the neck of the bottle, so as to hold the first and second segments folded over the third segment.

According to further features the first segment is folded over at least one before being folded over the second segment.

According to still further features the first and second segments are folded over at least once before being folded over the third segment.

According to still further features the bottle comprises a first folding indentation about the circumference of the bottle. According to still further features the first indentation is located at the lower part of the body of the bottle. According to still further features the length of flexible material is positioned within the first indentation; and wherein the first segment is adapted to be folded over the second segment along the first indentation.

According to still further features the bottle further comprises a second folding indentation. According to still further features the first and second segments are adapted to be folded over the third segment along the second folding indentation.

According to another embodiment there is provided a system for folding plastic bottles, the system including: a bottle having a first folding line formed along a circumference of the bottle on a lower part of a body of the bottle; and a strap, the strap formed of a length of flexible material and affixed around the circumference of the bottle and positioned within the first folding line; the bottle having a first partially compacted state wherein a first portion of the length of flexible material is positioned between a first segment of the bottle which is disposed below the strap and a second segment of the bottle which is disposed above the strap, wherein the first segment is folded over the second segment along the first folding line and the first portion is disposed in the first folding line between the first and second segments of the bottle, trapping the first portion between the first and second segments; and the bottle having a second compacted state wherein a second portion of the length of flexible material is positioned proximal to a neck of the bottle and adapted to be passed over the neck, wherein in the second, compacted state, the first and second segments are folded over a third segment of the bottle; and the bottle having a third, secured state, wherein the second portion is passed over the neck of the bottle, thereby securing the first and second segments of the bottle adjacent the third segment.

According to further features the bottle further includes a second folding line; wherein in the second compacted state the first and second segments are folded over the third segment of the bottle along the second folding line. According to still further features the folding line is selected from one of: an indentation, a scored line, a weakness.

According to another embodiment there is provided a method of securing a compacted mass of a bottle to a neck of the bottle, including: (a) providing the bottle with a first folding line; (b) providing a fastening belt affixed around a circumference of the bottle; (c) folding a first segment of the bottle over a second segment of the bottle along the first folding line, the first segment proximal a base of the bottle and disposed below the fastening belt and the second segment disposed above the fastening belt, such that a portion of the fastening belt is trapped within the first folding line between the first segment and the second segment; (c) folding the first and second segments over a third segment of the bottle, the third segment proximal the neck of the bottle, such that a second portion of the fastening belt is disposed proximal the neck of the bottle; and (d) securing the second portion of the fastening belt over the neck of the bottle, so as to hold the first and second segments adjacent the third segment.

According to further features the bottle includes a second folding line and wherein the first and second segments are folded over the third segment of the bottle along the second folding line. According to further features the folding line is selected from one of: an indentation, a scored line, a weakness.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a fastening device for compacted plastic bottles intended for recycling according to the present invention may be better understood with reference to the drawings and the accompanying description.

The purpose of the environmentally friendly invention is to allow consumers to reduce the volume of plastic bottle waste ready for recycling with the simple and easy to use accessory which holds a compacted bottle in the compacted state so that the bottle takes up less space. By reducing the volume of the empty bottles it is easier for consumers to actively participate in environmentally-friendly recycling of beverage bottles.

Attitudes towards environmental awareness and recycling are changing. Waste management is flourishing and a desire for preserving the environment is expanding. Green awareness is growing, not only on the personal level, but in the corporate world as well. For example, many grocery stores encourage their customers to return empty plastic bottles for recycling. Customers are able to return a bottle and receive, for example, €1 per 100 plastic bottles and/or a penny for a bottle. One can imagine the volume of 100 non-compacted bottles in a car trunk. The immediate accessory allows placing of about 400 compacted bottles into the same car trunk.

Figure 1A:
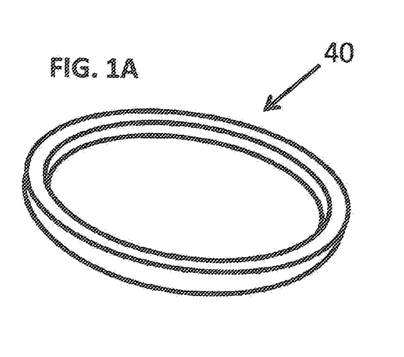
FIGS. 1A-D are various views of another embodiment of the invention.
Figure 1B:
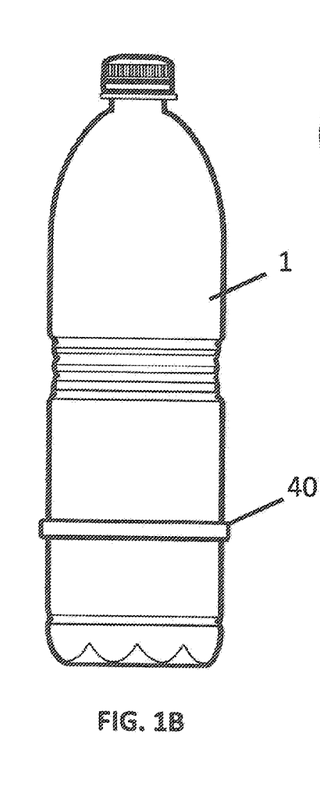

Another embodiment of the invention is shown in FIGS. 1A-1D. FIG. 1A illustrates an isometric view of a fastening accessory 40 of the immediate invention. Fastening accessory 40 is a belt that is fixed around the body 8 of a bottle 1. FIG. 1B illustrates a single-use, plastic beverage bottle that includes the second embodiment of the immediate invention, fixed around the body of bottle 1. This is the initial state of the bottle with the fastening accessory. Belt 40 is a length of flexible material affixed around a circumference of the bottle and positioned at the lower part of the bottle body 8. The ideal placement of the belt 40 is around the bottom third of the bottle body 8. Most preferably, the belt should be placed just above the base 7 of the bottle. The important factor is that when the bottle is folded up (and here, the bottle must be folded or rolled up) half of the belt is caught inside the folds while the other half of the belt 40 is on the exposed surface of the bottle, near the neck 2 of the bottle. A more detailed explanation can be found below.

The fastening accessory 40 is a length of preferably plastic material that is semi rigid or rigid and may be flexible. The band may or may not be stretchable or elastic. If the band/belt is of an elastic material, it is preferred that the elasticity of the material be very limited, e.g., having no more than 100% expansion capacity between a resting stated and a stretched holding state, and preferably less. In the resting state, the belt has a diameter approximately equal to the circumference of the bottle it is affixed to, and in the holding state, the diameter preferably increases only between about 10% and 50%. An example of a rigid, non-elastic material is a plastic cable tie. This material is flexible, even though it is not elastic. An example of a semi rigid yet elastic material is a thick rubber band, such as rubber band bracelet (e.g. promoting cancer awareness). Rubber band bracelets are known for including promotional information stamped onto or molded into the bracelet band. In preferred embodiments, the band has a width of between about 2 and 6 mm which may be sufficient to emboss or imprint directions for using the band as discussed herein. Such an advertisement would further catch the consumer's eye and act as a reminder to recycle the bottle (preferably using the accessory and method discussed herein) and to increase awareness for recycling in general.

Figure 1C:
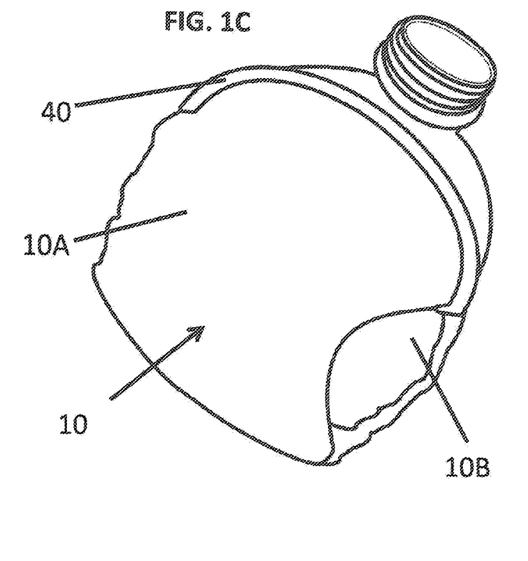

FIG. 1C illustrates the bottle of FIG. 1B in a second, folded-up state. The folded mass has an exposed section 10A and a hidden section 10B. Half of belt 40 is visible above the exposed part of the compacted mass 10 while the other half of the belt is hidden, as it is folded inside the hidden section 10B of the compacted mass 10. It is noted that belt 40 is in close proximity to neck 2 of the bottle. It is further noted that the belt is on the same side of the neck as the compacted mass.

Figure 1D:
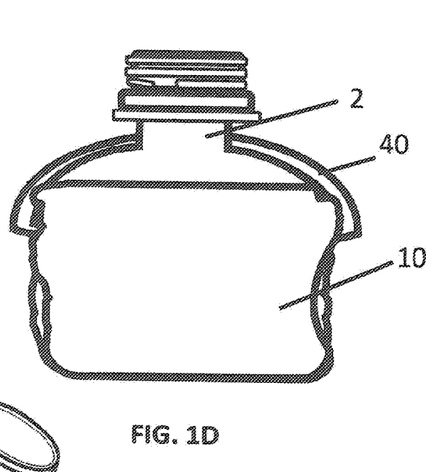

FIG. 1D shows compacted bottle of FIG. 1C, but now in a third state whereby the belt 40 has been moved to the far side of the bottle, and is obscured by neck 2. Belt 40, while being taut, has enough play and/or flexibility that the exposed half of the belt 40 can be lifted (relatively easily) over the neck 2 and finish 3 portions of bottle 1, in order to secure or clench the compacted mass 10 to the neck portion 2.

Figure 2A:
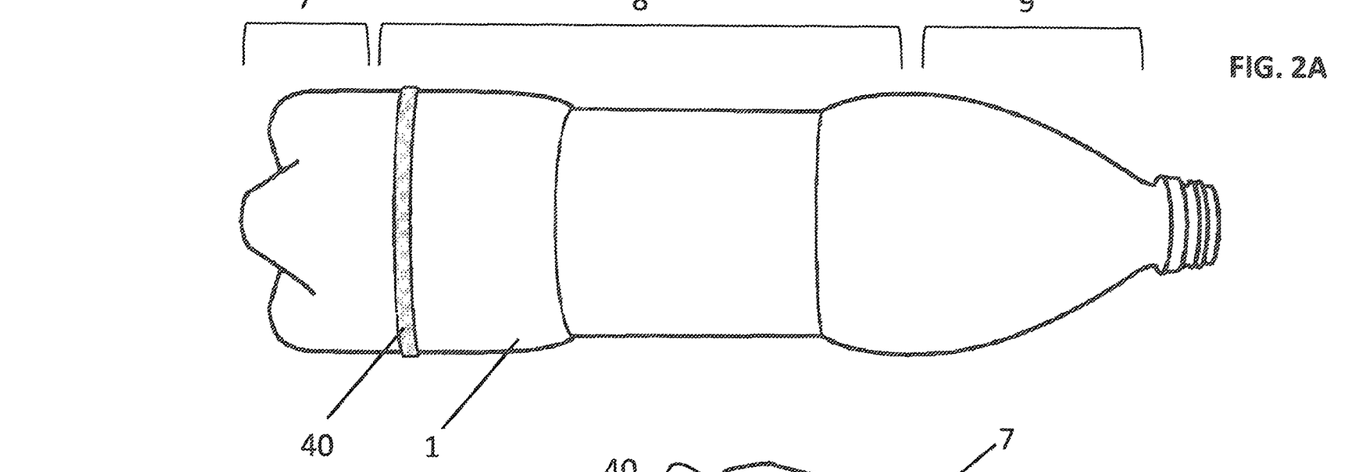
FIGS. 2A-2E' are stage-by-stage views of a method of compacting a recyclable plastic bottle using the fastening accessory of FIGS. 1A-D.

FIGS. 2A to 2D depict a stage-by-stage method of compacting a recyclable plastic bottle using the fastening accessory of the depicted embodiment. FIG. 2A illustrates the first stage of the process, which is to provide a fastening belt 40 on the body 8 of the bottle 1 affixed around a circumference of the bottle. The preferred placement of the belt has been discussed above, in reference to FIG. 1B. In order to start the process of compacting the bottle, it is useful to lay the bottle down to lie horizontally, as depicted in the Figure, on a surface.

Figure 2B:
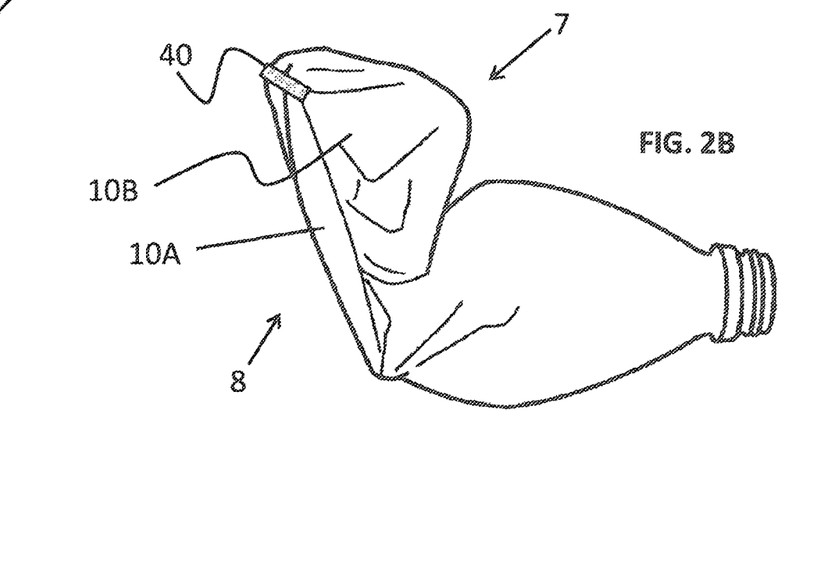

FIG. 2B depicts the second step of the method, in which the body of the bottle has been compacted. The body of the bottle can be rolled-up in any manner. One preferred method involves flattening the body of the bottle and folding the base over the flattened body. To accomplish this, for example, the user places the bottle horizontally, with the base nearest the user and the top of the bottle furthest from the user. Between two and four fingers of one or both hands are placed on the lower portion of the bottle body 8, with the thumbs resting on the bottom of the base 7 (i.e. between the base and the user). Two to four fingers (of one or both hands) are used to flatten the body of the bottle and the thumbs are then employed to fold the base over the flattened body, in the direction away from the user, folding the mass towards the top-/-neck 9 of the bottle.

FIG. 2B shows the compacted mass 10 of the bottle after being 'folded up' using the method described above, or any other method. It is important to point out that the hidden half of the belt 40, referred to as hidden belt portion 40B, is 'trapped' or caught in one of the folds of the bottle. Preferably, the hidden belt portion 40B of the belt is trapped in the first fold of the bottle, i.e. between the bottle base 7 and the lower portion of the body 8. For the sake of clarity, an outer-facing surface 10A of the compacted mass 10, is defined as being the surface which is roughly parallel to the slightly flattened shoulder and neck portions which abut the folded up portion of the bottle (see outer-surface 10A of FIG. 1C). The hidden surfaces of the bottle in the folded-up section of the bottle are labeled with reference 10B.

Figures 2C, 2D:
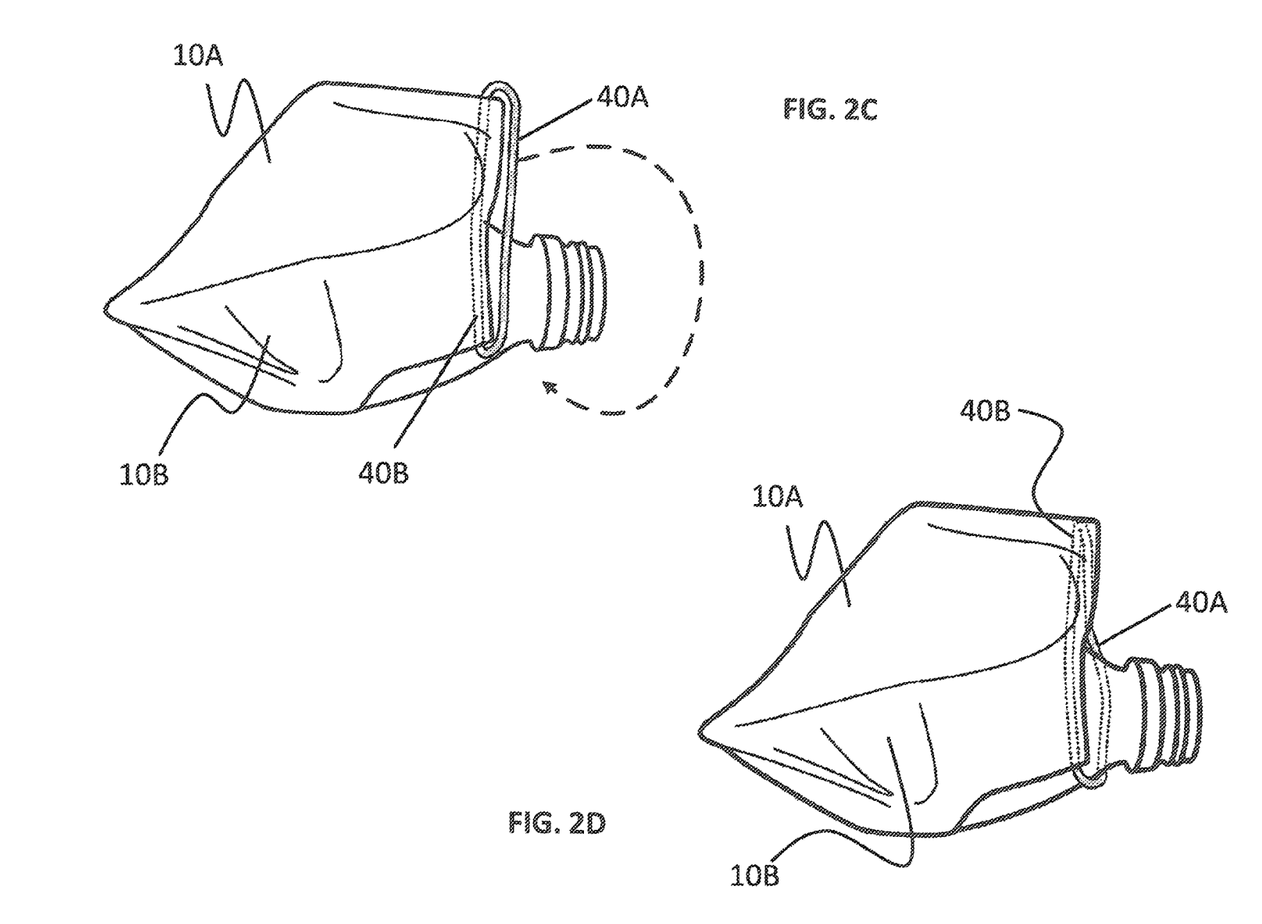

In FIG. 7C, about half of belt 40 is visible, and referred to as a visible or exposed belt portion 40A. The other approximately half of belt 40 is hidden (depicted by a broken line) and referred to as hidden belt portion 40B. In the Figure, the visible belt portion 40A is in close proximity to neck 2 and finish 3 of the bottle 1. In one preferred embodiment, the exposed section 40A of the fastening belt is proximal to a first side of the neck of the bottle after the base has been folded over the flattened body at least twice. A broken line arrow depicts the approximate direction in which the visible belt portion 40A must be moved in order to couple the compacted mass 10 to the neck of the bottle.

The final step of the method is depicted in FIG. 2D. FIG. 2D depicts the resultant state of the fastening accessory after looping the visible belt portion 40A over the bottle opening (neck and finish portions), while the hidden belt 40B (shown in dash lines) is caught in the folds of the compacted mass 10. A portion of the visible belt portion 40A is obscured by the neck of the bottle, and therefore depicted with a dashed line. The exposed/visible belt portion now rests (tightly) against the far side of the neck of the bottle.

Figure 2E:
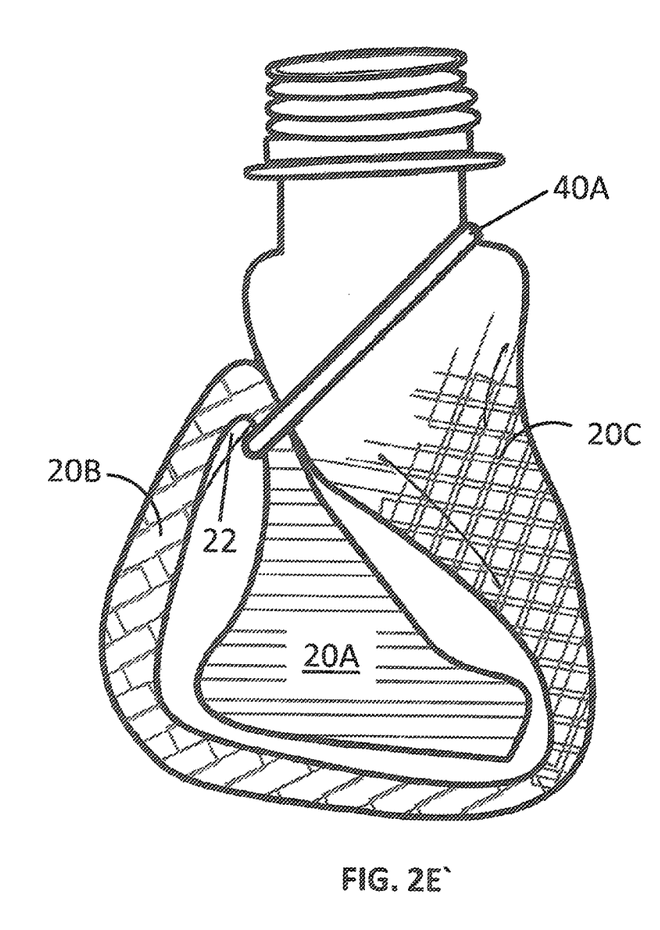

FIG. 2E is similar to FIG. 2D, but providing a perspective view. FIG. 2E' depicts the same view as FIG. 2E, but with the three segments indicated with different filler patterns. Fastening belt 40 is depicted in FIGS. 2E and 2E' securing bottle 1 in the folded state. Fastening belt 40 includes a length of flexible material affixed around a circumference of the bottle and positioned on a lower part of a body of the bottle.

A first portion 40B of the length of flexible material is adapted, in a first partially compacted state (shown in FIG. 2B), to be positioned between a first segment 20A (see FIG. 2E' and 7 of FIG. 2A) of the bottle which is disposed below the belt and a second segment 20B of the bottle which is disposed above the belt, whereby the first segment 20A is folded over the second segment 20B and the first portion 40B is disposed in a crease 22 (see FIG. 2E') of a fold between the first and second segments 20A, 20B of the bottle, effectively trapping the first portion 40B of the belt.

A second portion 40A of belt is adapted, in a second, compacted state (see FIG. 2C), to be positioned proximal a neck of the bottle. In the second, compacted state, the first and second segments 20A, 20B are folded over a third segment 20C of the bottle. The second portion of the belt 40A is adapted to be passed over the neck of the bottle.

In a third, secured state (see FIGS. 2D, 2E and 2E'), the second portion of the belt 40A is already passed over the neck of the bottle, thereby securing the first and second segments 20A, 20B of the bottle held adjacent to the third segment 20C.

The fastening accessory 40 may be affixed to the bottle 1 during the manufacturing process of the bottle or at the packaging plant (after the bottle has been sealed with the closure/cap) or post-manufacture, e.g. by the wholesaler/retailer or post-purchase by the buyer. Accordingly, the fastening accessory may be purchased when already affixed to the bottle or separately for home use. If bought separately, the buyer may attach the accessory before the beverage is opened or once the bottle is empty. The accessory may be comprised of a similar material to the recyclable bottle or a different material. The accessory may have different dimensions than those specifically mentions or depicted in the Figures.

Figure 3A:
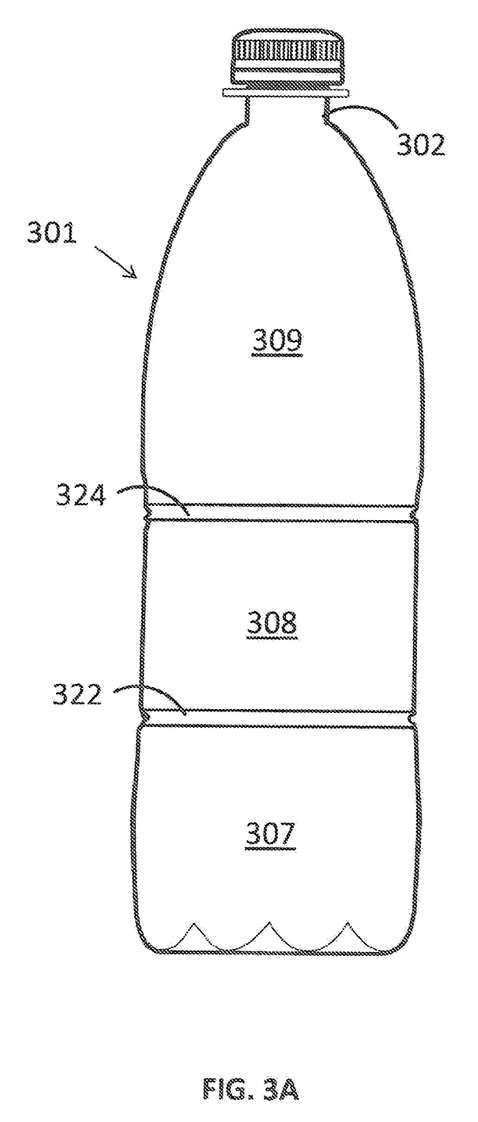
FIG. 3A is a view of a second embodiment of the invention, whereby the bottle includes folding indentations.

A second embodiment of the invention is depicted in FIG. 3A. FIG. 3A illustrates a bottle 301 including at least one folding line 322. While the bottle 301 is depicted including two folding lines it is made clear that the scope of the invention includes a bottle with only one folding line. Preferably the single line is located on the bottom third of the body of the bottle.

In one configuration, the folding line 322 is a recessed channel or indentation created during the manufacturing process. In alternative configurations, folding line 322 is a scoring or weakening along a circumferential plane of the bottle. The purpose and function of the indentation is to provide an area of the bottle which is generally susceptible to bending and folding (preferably more susceptible than the rest of bottle) so as to allow a lower portion 307 (the term "portion" is used interchangeably herein with the terms "section", "segment", "part" and the like) of the bottle 301 to be easily folded over a middle portion 308 of the bottle. The indentation further or alternatively functions as a folding guide, which indicates to the user how and where to fold the bottle.

In additional embodiments, bottle 301 includes a second folding line 324. In preferred embodiments, the folding line is located in the upper third of the bottle, as depicted in FIG. 3A. The second folding line is adapted to facilitate folding of the first and second portions 307, 308 of the bottle over the third portion 309 of the bottle. The folded state is depicted in FIG. 3C (the figure also illustrates the fastening belt securing the bottle in the folded state).

Figure 3B:
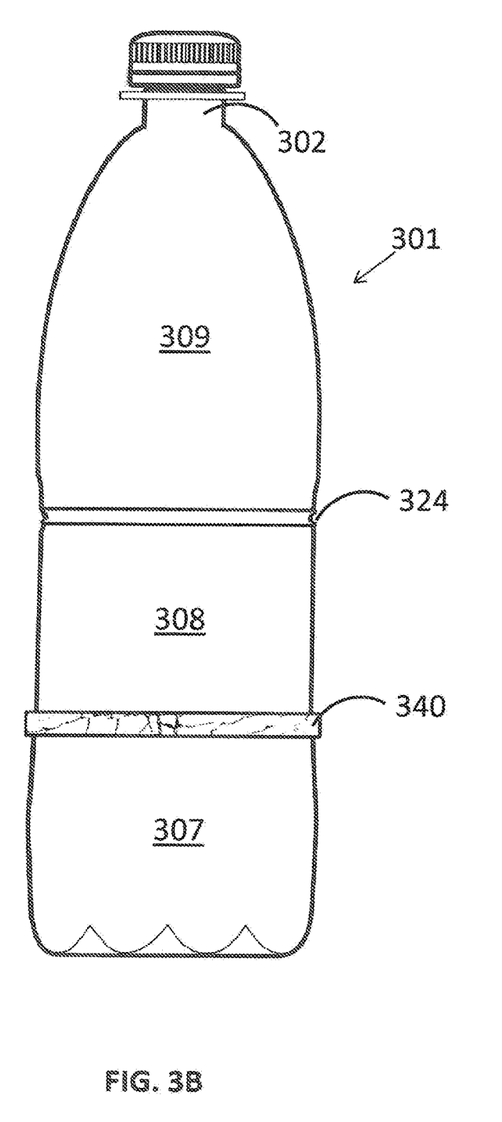
FIG. 3B is a view of the embodiment of FIG. 3A including a fastening belt positioned within one the folding indentations.

FIG. 3B illustrates the embodiment of FIG. 3A further including a fastening belt 340 positioned within the lower folding indentation. Exemplarily, the fastening belt is a strap or band of flexible material. In preferred embodiments, the fastening belt or strap 340 has the same or similar properties to fastening belt 40 discussed above.

In other embodiments, fastening belt 340 is positioned within the upper folding indentation, (second folding line 324). In this position, once folded as depicted in FIG. 3C, the external section of the fastening belt 340 is cinched around the neck 302 of the bottle. The belt is extended around [folded] segment 308 and secured to the side of the neck that is opposite the side of the folded segments (similar to the depiction of FIG. 3C where the folded segments are on the left-hand side and the band is secured to the right-hand side of the neck of the bottle).

Figure 3C:
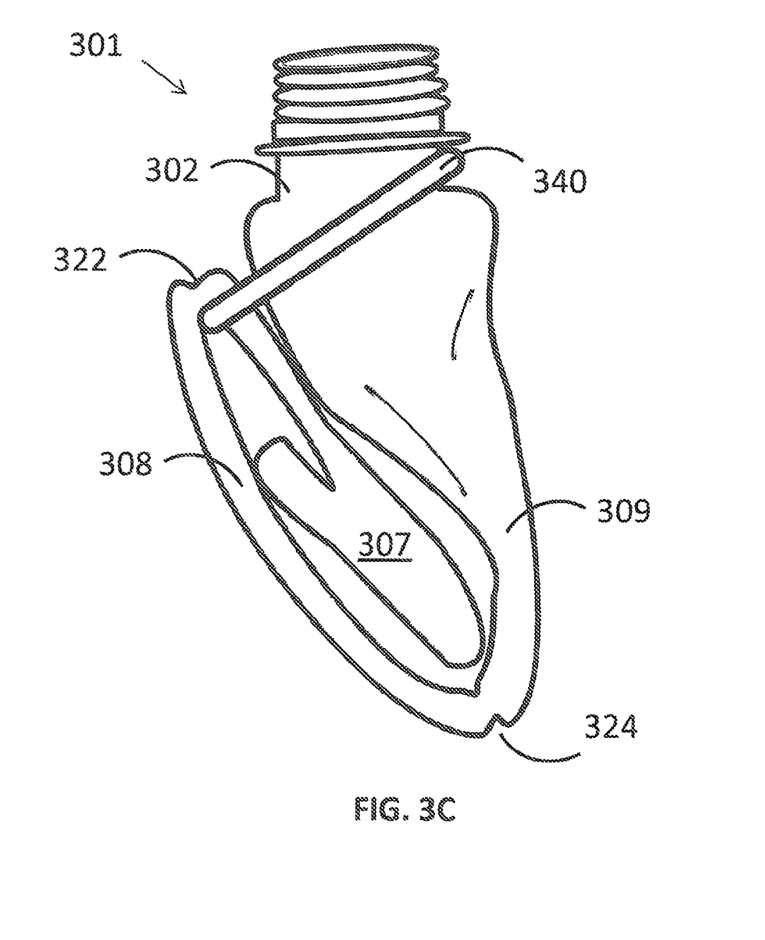
FIG. 3C is a perspective view of the embodiments of FIGS. 3A and 3B in a folded and secured state.

FIG. 3C illustrates bottle 301 in a folded and secured state. Bottle 301 is depicted where lower segment 307 is folded against middle segment 308 at the first folding line 322, and the segments 307, 308 are folded against the upper segment 309 at the second folding line/indentation 324. The band 340 is then looped over the bottle neck 302 so that the band holds the folded segments together in the folded state by the tension exerted by the band 340 on both the facing side of the bottle neck and the crease/fold/indentation between the folded lower and middle segments 307, 308.

While the invention has been described with respect to a limited number of embodiments, it will be appreciated that many variations, modifications and other applications of the invention may be made. It is also made clear that the depicted and described embodiments are merely exemplary and the invention can be applied to recyclable bottles of all sizes and shapes, where the accessories and methods described above are applicable. It is understood that the given dimensions relate to 1.5 liter bottles, and as such, the given dimensions must be adjusted accordingly, relative to the bottles or containers that the invention is applied to. As such, the claimed invention as recited in the claims that follow is not limited to the embodiments described herein.

What is claimed is:

1. A fastening belt for a recyclable, plastic, beverage bottle, the fastening belt comprising:
    a length of flexible material affixed around a circumference of the bottle and positioned on a lower part of a body of the bottle;
    a first portion of said length of flexible material configured, in a first partially compacted state, to be positioned between a first segment of the bottle which is disposed below the belt and a second segment of the bottle which is disposed above the belt, wherein said first segment is folded over said second segment and said first portion is disposed in a crease of a fold between said first and second segments of the bottle, trapping said first portion in said fold; and
    a second portion of said length of flexible material configured, in a second, compacted state, to be positioned proximal a neck of the bottle and adapted to be passed over said neck, wherein in said second, compacted state, said first and second segments are folded over a third segment of the bottle, and, in a third, secured state, said second portion is passed over said neck of the bottle, thereby securing said first and second segments of the bottle adjacent said third segment.

2. The fastening belt of claim 1, wherein said fastening belt is affixed around the bottle in a manufacturing plant or a packaging plant, wherein said length of flexible material, in a flexed state, is equal to said circumference of the bottle.

3. The fastening belt of claim 1, wherein said length of flexible material is positioned in a location selected from the group including: on a lower third of said body near a base of the bottle and immediately above said base of the bottle.

4. The fastening belt of claim 1, wherein said length of flexible material is made of a material selected from the group including: a non-elastic, plastic material and an elastic material.

5. The fastening belt of claim 4, wherein the fastening belt has a resting state and a holding state, in said resting state, the fastening belt has a diameter approximately equal to said circumference of the bottle, and in said holding state, said diameter increases between about 10% and 50%.

6. The fastening belt of claim 1, wherein said length of flexible material has dimensions selected from the group including: a width between about 2 and 6 mm, a width between about 1 and 2 mm, and a width of more than 6 mm.

7. The fastening belt of claim 6, wherein the fastening belt includes embossed or engraved informational material.

8. The fastening belt of claim 1, wherein the bottle comprises a first folding indentation about said circumference of the bottle.

9. The fastening belt of claim 8, wherein said first indentation is located at said lower part of said body of the bottle, and said length of flexible material is positioned within said first indentation; and wherein said first segment is adapted to be folded over said second segment along said first indentation.

10. The fastening belt of claim 8, wherein the bottle further comprises a second folding indentation wherein said first and second segments are adapted to be folded over said third segment along said second folding indentation.

11. A method of securing a compacted mass of a bottle to a neck of the bottle, comprising:
    (a) providing a fastening belt affixed around a circumference of the bottle;
    (b) folding a first segment of the bottle over a second segment of the bottle, said first segment proximal a base of the bottle and disposed below said fastening belt and said second segment disposed above said fastening belt, such that a portion of said fastening belt is trapped between said first segment and said second segment;
    (c) folding said first and second segments over a third segment of the bottle, said third segment proximal the neck of the bottle, such that a second portion of said fastening belt is disposed proximal the neck of the bottle; and (d) securing said second portion of said fastening belt over the neck of the bottle, so as to hold said first and second segments adjacent said third segment.

12. The method of claim 11, wherein said first segment is folded over at least one before being folded over said second segment.

13. The method of claim 11, wherein said first and second segments are folded over at least once before being folded over said third segment.

14. The method of claim 11, wherein said fastening belt is affixed around the bottle in a manufacturing plant or a packaging plant.

15. A system for folding plastic bottles, the system comprising:
 a bottle having a first folding line formed along a circumference of said bottle on a lower part of a body of the bottle; and
 a fastening belt, said fastening belt, comprised of a first portion and a second portion formed of a length of flexible material, affixed around said circumference of the bottle and positioned within said first folding line;
 said bottle configured with a first partially compacted state wherein a first portion of said fastening belt is positioned between a first segment of the bottle which is disposed below said fastening belt and a second segment of the bottle which is disposed above said fastening belt, wherein said first segment is folded over said second segment along said first folding line and said first portion is disposed in said first folding line between said first and second segments of the bottle, trapping said first portion between said first and second segments; and
 said bottle configured with a second compacted state wherein a second portion of said fastening belt is positioned proximal to a neck of said bottle and adapted to be passed over said neck, wherein in said second, compacted state, said first and second segments are folded over a third segment of said bottle; and
 said bottle configured with a third, secured state, wherein said second portion is passed over said neck of said bottle, thereby securing said first and second segments of said bottle adjacent said third segment.

16. The system of claim 15, wherein said bottle further includes a second folding line; wherein in said second compacted state said first and second segments are folded over said third segment of said bottle along said second folding line.

17. The system of claim 15, wherein said folding line is selected from one of: an indentation, a scored line, and, a weakness.

18. The system of claim 15, further comprising a plurality of bottles in a pack, each with a corresponding fastening belt.

19. A method of securing a compacted mass of a bottle to a neck of the bottle, comprising:
 (a) providing the bottle with a first folding line;
 (b) providing a fastening belt affixed around a circumference of the bottle;
 (c) folding a first segment of the bottle over a second segment of the bottle along said first folding line, said first segment proximal a base of the bottle and disposed below said fastening belt and said second segment disposed above said fastening belt, such that a portion of said fastening belt is trapped within said first folding line between said first segment and said second segment;

(d) folding said first and second segments over a third segment of the bottle, said third segment proximal the neck of the bottle, such that a second portion of said fastening belt is disposed proximal the neck of the bottle; and (e) securing said second portion of said fastening belt over the neck of the bottle, so as to hold said first and second segments adjacent said third segment.

20. The method of claim 19, wherein the bottle includes a second folding line and wherein said first and second segments are folded over said third segment of the bottle along said second folding line.

21. The method of claim 19, wherein said folding line is selected from one of: an indentation, a scored line, and, a weakness.

22. A bottle having an initial, uncompressed state and a second, folded-up state, comprising:
 a body comprised of a first segment, a second segment, and a third segment, wherein the first segment and the second segment are divided by a folding line;
 a neck of the bottle, disposed proximally to the third segment of the body;
 a fastening belt of flexible material comprised of a first portion and a second portion wherein the first portion is trapped by the first segment and the second segment at the folding line in the folded-up state; and,
 wherein in the second, folded-up state the first segment is folded at the folding line around the first portion of the fastening belt and is disposed in between the second and third segments, and the second portion of the fastening belt is disposed over and around the neck, such that the first portion is located within a fold of the bottle and the second portion is located externally around the bottle.

23. The bottle of claim 22, wherein a length of the fastening belt, in a flexed state, is equal to a circumference of the bottle.

24. The bottle of claim 22, wherein the fastening belt is positioned on a lower third of the body near a base of the bottle.

25. The bottle of claim 22, wherein the fastening belt is made of a non-elastic, plastic material.

26. The bottle of claim 22, wherein said fastening belt is made of an elastic material.

27. The bottle of claim 26, wherein the fastening belt has a resting state and a holding state, wherein in said resting state, the fastening belt has a diameter approximately equal to said circumference of the bottle, and wherein in said holding state, said diameter increases between about 10% and 50%.

28. The bottle of claim 22, wherein the fastening belt includes embossed or engraved informational material.

29. The bottle of claim 22, wherein said fastening belt has a width between about 2 and 6 mm.

30. The bottle of claim 22, wherein said fastening belt has a width between about 1 and 2 mm.

31. The bottle of claim 22, wherein said fastening belt has a width of more than 6 mm.

32. The bottle of claim 22, wherein the bottle comprises a first folding indentation about said circumference of the bottle.

33. The bottle of claim 32, wherein said fastening belt is positioned within said first indentation; and wherein said first segment is adapted to be folded over said second segment along said first indentation.

34. The bottle of claim 32, wherein the body further comprises a second folding indentation.

35. The bottle of claim 34, wherein said first and second segments are adapted to be folded over said third segment along said second folding indentation.

36. A bottle in a folded-up state, comprising:
a folded body comprised of a first segment, a second segment, and a third segment, the first segment and the second segment divided by and folded at a folding line such that the first segment is disposed between the second segment and the third segment;
a fastening belt of flexible material comprised of a first portion and a second portion, wherein the first portion is located within the folding line internally and between the first segment and second segment, and the second portion is located externally around a neck of the bottle disposed proximally to the third segment, and
wherein the fastening belt is sized and sufficiently elastic to retain the bottle in the folded-up state when the first portion is located in the folding line and the second portion is located externally around the neck.

37. The bottle of claim 36, wherein a length of the fastening belt, in a flexed state, is equal to a circumference of the bottle.

38. The bottle of claim 36, wherein the fastening belt is positioned on a lower third of the body near a base of the bottle.

39. The bottle of claim 36, wherein the fastening belt is made of a non-elastic, plastic material.

40. The bottle of claim 36, wherein said fastening belt is made of an elastic material.

41. The bottle of claim 40, wherein the fastening belt has a resting state and a holding state, wherein in said resting state, the fastening belt has a diameter approximately equal to a circumference of the bottle, and wherein in said holding state, said diameter increases between about 10% and 50%.

42. The bottle of claim 36, wherein the fastening belt includes embossed or engraved informational material.

43. The bottle of claim 36, wherein said fastening belt has a width between about 2 and 6 mm.

44. The bottle of claim 36, wherein said fastening belt has a width between about 1 and 2 mm.

45. The bottle of claim 36, wherein said fastening belt has a width of more than 6 mm.

46. The bottle of claim 36, wherein the bottle comprises a first folding indentation about said circumference of the bottle.

47. The bottle of claim 46, wherein said fastening belt is positioned within said first indentation; and wherein said first segment is adapted to be folded over said second segment along said first indentation.

48. The bottle of claim 46, wherein the body further comprises a second folding indentation.

49. The bottle of claim 48, wherein said first and second segments are adapted to be folded over said third segment along said second folding indentation.

* * * * *